(12) United States Patent
Fujino

(10) Patent No.: US 8,091,341 B2
(45) Date of Patent: Jan. 10, 2012

(54) EXHAUST GAS PURIFICATION METHOD AND EXHAUST GAS PURIFICATION SYSTEM

(75) Inventor: Ryusuke Fujino, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 26 days.

(21) Appl. No.: 11/919,928

(22) PCT Filed: Apr. 24, 2006

(86) PCT No.: PCT/JP2006/308536
§ 371 (c)(1),
(2), (4) Date: Nov. 6, 2007

(87) PCT Pub. No.: WO2006/123511
PCT Pub. Date: Nov. 23, 2006

(65) Prior Publication Data
US 2009/0044524 A1    Feb. 19, 2009

(30) Foreign Application Priority Data
May 17, 2005   (JP) .................................. 2005-143519

(51) Int. Cl.
*F01N 3/00* (2006.01)
(52) U.S. Cl. ................ 60/286; 60/295; 60/297; 60/301; 60/303; 60/311
(58) Field of Classification Search .................... 60/274, 60/286, 295, 301, 303, 297, 311
See application file for complete search history.

(56) References Cited

U.S. PATENT DOCUMENTS
4,854,123 A * 8/1989 Kobayashi et al. ............. 60/274
4,955,183 A * 9/1990 Kolodzie et al. ................ 60/303
5,038,562 A * 8/1991 Goerlich ......................... 60/274
6,314,722 B1 * 11/2001 Matros et al. .................. 60/274
6,449,947 B1 * 9/2002 Liu et al. ........................ 60/286

(Continued)

FOREIGN PATENT DOCUMENTS
JP       63-302120      12/1988
(Continued)

OTHER PUBLICATIONS

International Search Report (PCT/ISA/210) of International Application PCT/JP2006/308536 (mailed on Jul. 25, 2006).

(Continued)

*Primary Examiner* — Thomas Denion
*Assistant Examiner* — Diem Tran
(74) *Attorney, Agent, or Firm* — Staas & Halsey LLP

(57) ABSTRACT

Exhaust gas purification method where a purification agent, consumed by an exhaust gas purifier arranged in the exhaust passage of an internal combustion engine, is supplied by an injector in an exhaust pipe into the exhaust passage on the upstream side of the exhaust gas purifier and mixed with exhaust gas. The exhaust passage is provided with a step beyond which the exhaust passage expands in order to generate swirls in the exhaust gas flow, and the purification agent is introduced at the step or in the vicinity thereof, thus accelerating atomization of the purification agent. Consequently, vaporization and diffusion of the purification agent can be accelerated efficiently within a short distance in the exhaust passage, and the purification agent can reach the exhaust gas purifier under a state where the purification agent is made uniform. Consequently, an exhaust gas purification system can be used even in small vehicles.

4 Claims, 7 Drawing Sheets

U.S. PATENT DOCUMENTS

| | | | |
|---|---|---|---|
| 6,601,385 B2 * | 8/2003 | Verdegan et al. | 60/286 |
| 6,722,123 B2 * | 4/2004 | Liu et al. | 60/286 |
| 6,973,776 B2 * | 12/2005 | van Nieuwstadt et al. | 60/286 |
| 7,021,047 B2 * | 4/2006 | Hilden et al. | 60/286 |
| 7,614,222 B2 * | 11/2009 | Hemingway et al. | 60/324 |
| 2003/0070424 A1 | 4/2003 | Verdegan et al. | |
| 2004/0237511 A1 | 12/2004 | Ripper et al. | |
| 2005/0017615 A1 | 8/2005 | Mahr | |

FOREIGN PATENT DOCUMENTS

| | | |
|---|---|---|
| JP | 2-223624 | 9/1990 |
| JP | 6-235317 | 8/1994 |
| JP | 7-83043 | 3/1995 |
| JP | 10-30431 | 2/1998 |
| JP | 11-166410 | 6/1999 |
| JP | 11-512165 | 10/1999 |
| JP | 2000-145434 | 5/2000 |
| JP | 2002-213233 | 7/2002 |
| JP | 2004-44405 | 2/2004 |
| JP | 2004-510909 | 4/2004 |
| JP | 2005/76460 | 3/2005 |
| WO | 97-07876 | 3/1997 |
| WO | WO 03/004839 | 1/2003 |

OTHER PUBLICATIONS

Patent Abstract of Japan, Publication No. 02-223624, Publication Date Sep. 6, 1990.
Patent Abstract of Japan, Publication No. 06-235317, Publication Date Aug. 23, 1994.
Patent Abstract of Japan, Publication No. 2002-213233, Publication Date Jul. 31, 2002.
Patent Abstract of Japan, Publication No. 11-512165, Publication Date.
Extended European Search Report dated Dec. 1, 2010 in application No. 06745614.5.

* cited by examiner

EXHAUST GAS PURIFICATION METHOD AND EXHAUST GAS PURIFICATION SYSTEM

This application claims the benefit under 35 U.S.C. Section 371, of PCT international Application No. PCT/JP2006/308536 filed Apr. 24, 2006 and Japanese Application No. 2005-143519 filed May 17, 2005 in Japan, this contents of which are incorporated herein by reference.

FIELD OF THE INVENTION

The present invention relates to an exhaust gas purification method and an exhaust gas purification system for injecting a purification agent into an exhaust passage to thereby purify exhaust gas from an internal combustion engine or regenerate an exhaust gas purifier.

DESCRIPTION OF THE RELATED ART

Automobile emission standards have become increasingly strict and therefore have hardly been met just by technical development of engines. For this reason, purification of exhaust gas by use of an aftertreatment device is essential. Various studies and proposals are carried out about NOx catalysts for reducing and removing NOx (nitrogen oxide) in exhaust gases from internal combustion engines such as diesel engines, parts of gasoline engines, and from various combustion systems, and about diesel particulate filter systems (hereinafter referred to as "DPF systems") for removing particulate matter (hereinafter referred to as "PM") in such exhaust gases.

These studies and proposals include an ammonia selective reduction type NOx catalyst (Selective Catalytic Reduction: SCR catalyst), a NOx occlusion reduction type catalyst and a NOx direct reduction type catalyst as a DeNOx catalyst for diesel engines.

In an exhaust gas purification system provided with the ammonia selective reduction type NOx catalyst, an ammonia system solution (herein referred to as a "purification agent") such as a urea aqueous solution, ammonia or aqueous ammonia is injected into the exhaust pipe between the engine outlet and the ammonia selective reduction type NOx catalyst to thereby mix the exhaust gas and the ammonia system solution. Then, with the aid of a selective reduction reaction to react the ammonia generated from the solution with NOx, the NOx is purified.

Also, in an exhaust gas purification system provided with the NOx occlusion reduction type catalyst, the NOx occlusion reduction type catalyst is formed by carrying a noble metal catalyst with an oxidation function, and NOx occluding material with a NOx occluding function, such as an alkali metal. Such components allow either of the two functions to be fulfilled, i.e., NOx occlusion or NOx release and purification depending on the oxygen concentration in the exhaust gas. When an estimated NOx occlusion amount reaches a NOx saturation amount, the air/fuel ratio of the exhaust gas is brought into a rich state, and then regeneration control is performed to recover the NOx occluding ability. One of the regeneration controls is an exhaust pipe injection rich control in which a hydrocarbon (herein referred to as a "purification agent") such as fuel is directly supplied into an exhaust pipe.

Further, in an exhaust gas purification system provided with the NOx direct reduction type catalyst, the NOx direct reduction type catalyst carries a catalytic component metal such as rhodium (Rh) or palladium (Pd) on a carrier such as β-zeolite to directly reduce NOx. Then, if the NOx reducing ability deteriorates, the air/fuel ratio of the exhaust gas is brought to a rich air/fuel ratio in order to perform regeneration control for recovering the NOx reducing ability in which the active substance of the catalyst is activated by being regenerated. One of the regeneration controls is exhaust pipe injection rich control in which a hydrocarbon (herein referred to as a "purification agent") such as fuel is directly supplied into the exhaust pipe.

Still further, in an exhaust gas purification system provided with a continuous regeneration type DPF for trapping PM (particulate matter) in the exhaust gas, the PM trapped and accumulated in a filter part is combusted and removed to thereby regenerate the filter. For this purpose, a hydrocarbon (herein referred to as a "purification agent") such as light oil fuel is supplied into the exhaust pipe through exhaust pipe injection to oxidize the hydrocarbon with use of an oxidation catalyst arranged on the upstream side of the filter or that carried by the filter. This oxidation raises the filter temperature to thereby combust and remove the PM in the filter area.

In such exhaust pipe injection, if the purification agent reaches the catalyst or the continuous regeneration type DPF in a nonuniform state, efficiency in the purification of NOx in the exhaust gas or in regeneration of the NOx catalyst or continuous regeneration type DPF is reduced, and also the purification agent is not sufficiently consumed and therefore discharged to the downstream side. For this reason, supplying a uniform and substantial amount of the purification agent into the exhaust gas to make uniform a mixing ratio (concentration) between the exhaust gas and the purification agent becomes important, and to do so, various methods have been devised.

One of the methods that has been proposed, for example, is an ammonia mixing device in a denitrification device in which an aqueous ammonia atomizing nozzle is enclosed by a cylindrical guide for facilitating vaporization as described in Japanese Patent Application Kokai Publication No. H02-223624. In this device, the tip of the aqueous ammonia atomizing nozzle is protruded into an elbow forming an exhaust passage. Also, the nozzle is placed such that the direction of the atomizing of the aqueous ammonia is the same as the flow direction of the exhaust gas.

However, in the case where a nozzle is provided in the elbow, the exhaust gas flow is largely bent in the elbow. For this reason, the purification agent atomized into the exhaust gas collides with the lateral surface of the curve of the elbow due to the action of centrifugal force. Accordingly, there arises the problem whereby attachment of the unvaporized purification agent to the lateral surface of the elbow in a liquid state cannot be avoided.

Also, there has been proposed, for example, an exhaust emission control device in which the distance between the atomization port of an atomization device and the exhaust emission control device (purification material) is controlled to range from 100 to 600 mm and the hydrocarbon temperature to range from 300 to 400° C. so that the atomized hydrocarbon can sufficiently diffuse while thermal decomposition of the hydrocarbon is avoided, as described in Japanese Patent Application Kokai Publication No. H06-235317.

However, in such a configuration, the atomization port is too close to the inlet of the exhaust emission control device and the purification agent and exhaust gas are mixed inside the exhaust emission control device so that a lack of uniform mixing of the purification agent and exhaust gas arises.

Further, as described in Japanese Patent Application Kokai Publication No. 2002-213233, there has been proposed, for example, an exhaust emission control structure for an engine in which to uniformly diffuse a reducing agent in exhaust gas a throttle part is situated in the exhaust pipe at the downstream position of the reducing agent injecting device (mixing part) and thereby a low pressure state is generated locally by a high flow velocity to promote vaporization of the reducing agent, or an agitating member is situated in the exhaust pipe at the downstream position of the reducing agent injecting device (mixing part), and thereby turbulence is generated to promote agitation in the flow of the exhaust gas.

However, in the case where the throttle part is set up, the flow direction of the reducing agent in the atomized state changes to the central direction in the throttle part, so that there arises the problem whereby the reducing agent in the atomized state on which inertial force acts collides with the wall surface in the throttle part and thereby attaches to it in a liquid state. Also, in the case where the agitating member is set up, there exists the problem whereby the reducing agent in the atomized state collides with the agitating member and thereby attaches to it in a liquid state as well.

Still further, there have been proposed, for example, a method and a device for decomposing oxides of nitrogen in the exhaust gases from an internal-combustion engine in which compressed air compressed by a compressor and a reagent (purification agent) such as aqueous urea are mixed and then sprayed into the exhaust pipe from a spray device for atomization so that the purification agent can be easily vaporized as described in Published Patent Application Japanese Translation of PCT International Application No. H11-512165.

However, supplying the purification agent based on such an air assist system is only available to large-size or medium-size vehicles equipped with an air tank and a compressor. For this reason, it is difficult to employ the air assist system for pickup trucks or passenger cars because they are not equipped with the air tank. Accordingly, it is preferable to employ an airless system for pickup trucks and passenger cars. However, in the airless system, it is generally known that uniform diffusion of the sprayed aqueous urea solution is hardly ensured.

As one of the airless systems, there has been considered a method in which a long divergent pipe is provided so that the purification agent sprayed into the exhaust pipe can be uniformly diffused to thereby create a space where it can be vaporized and diffused. However, in this method, the distance from the spray position to the catalyst or the like becomes longer, so that there arises the problem whereby in running mode under emission standards based on transient operation, purification control or regeneration control is not sufficiently obtained because of a response delay.

Patent Document 1: Japanese Patent Application Kokai Publication No. H02-223624
Patent Document 2: Japanese Patent Application Kokai Publication No. H06-235317
Patent Document 3: Japanese Patent Application Kokai Publication No. 2002-213233
Patent Document 4: Published Patent Application Japanese Translation of PCT International Application No. H11-512165

SUMMARY OF THE INVENTION

The present invention is made in order to solve the above problems, and it is therefore an objective of the present invention to provide an exhaust gas purification method and an exhaust gas purification system that are capable of mixing and injecting compressed air to thereby efficiently accelerate vaporization and diffusion of a purification agent within a short distance in an exhaust pipe, and making the purification agent reach the exhaust gas purifier in a uniform state and can be used even for a compact car in which the air assist system for atomizing the purification agent cannot be used.

The exhaust gas purification method to accomplish the above object includes: supplying a purification agent to be consumed in an exhaust gas purifier placed in an exhaust passage of an internal combustion engine into the exhaust passage on the upstream side of the exhaust gas purifier with the use of an exhaust pipe injector; and mixing the purification agent into the exhaust gas, wherein a step for making the exhaust passage larger than that on the upstream side of a position in the exhaust passage is provided at a position in the exhaust passage to generate swirls of the exhaust gas, and the purification agent is injected to the position of the step or its vicinity to accelerate atomization of the purification agent.

Note that the vicinity of the step refers to a range within which at least a part of the purification agent having been injected (or atomized) gets caught in the swirls generated by the step, and includes both upstream and downstream sides of the step.

Also, the step may have an equally expanding shape, i.e., an area center (gravity center) of a smaller cross-sectional area part on the upstream side and that of a larger cross-sectional area part on the downstream side may be made to coincide with each other. However, depending on the arrangement of the exhaust pipe, the injecting direction, the injecting rate, or the flow velocity of the exhaust gas, it may have an unequally expanding shape, i.e., the area center of the smaller cross-sectional area part on the upstream side and that of the larger cross-sectional area part on the downstream side may be brought into a state where they do not coincide. In other words, in a case of a circular pipe, a smaller diameter pipe may be concentrically connected to a larger diameter pipe, or eccentrically connected to it. On the other hand, in a case of a square pipe, the step may have an equally expanding shape, unequally expanding shape, or partially expanding shape.

Based on such a configuration, the swirls generated by the step accelerates mixing of the purification agent having been injected to the swirl part of the exhaust gas or its vicinity and the exhaust gas. The mixing allows the purification agent to be uniformly dispersed and vaporized within a short distance. For this reason, the purification agent is efficiently vaporized and diffused within a short distance in the exhaust pipe. Accordingly, the purification agent gets to reach the exhaust gas purifier in a uniform state.

That is, the step is provided in the exhaust passage (exhaust pipe) to purposely generate swirls in the stable exhaust gas flow, and the purification agent is injected into the exhaust gas in the vicinity of a part where swirls are generated. The injected and atomized purification agent is once taken into the swirl region, and then flows downstream while being mixed with and diffused in the exhaust gas. For this reason, the purification agent can be prevented from coming into a nonuniform state with respect to a cross section of the flow.

Accordingly, a local reduction in exhaust gas temperature due to the nonuniform distribution of the purification agent can be avoided. Also, the purification agent is uniformly distributed, the exhaust gas temperature is made uniform, and a reduced temperature part is not present, so that the purification agent is efficiently vaporized.

Accordingly, even with an arrangement in which a distance between a position for injecting the purification agent and the exhaust gas purifier is short, the purification agent can be supplied to the exhaust gas purifier while being uniformly diffused. For this reason, even in running mode under the emission standards based on transient operation, the response delay becomes smaller, and the ability of following up of purification control or regeneration control is improved.

Also, such a configuration in which the step is provided, i.e., a configuration in which a cross-sectional area of the exhaust passage is discontinuously varied is simple, and compared with the configuration in which the agitating member or the like is provided in the exhaust passage, there is no possibility that pressure loss of the exhaust passage due to attachment of the purification agent, particulate matter (PM) in the exhaust gas, and the like is increased.

Further, in the above exhaust gas purification method, if the purification agent injected into the exhaust passage is made to collide with a dispersing member to accelerate the atomization of the purification agent, the purification agent can be more finely atomized and more uniformly dispersed. The dispersing member includes a collision plate in which the part with which the purification agent collides forms an appropriate angle (e.g., 30 to 60°) with the injecting direction of the purification agent, and the like. In addition, if the injecting direction is made parallel to the flow of the exhaust gas, the collision plate may be formed of a rod-like body having a cone-like shape with a tip that faces to the injection port for the purification agent.

In addition, for a geometry of the surface with which the purification agent collides, a flat surface is typically used because of the easiness of fabrication; however, in order to optimize the diffusion distribution of the injected purification agent, a curved surface such as a cylindrical surface, spherical surface, or conic surface may be used.

Alternatively, the exhaust gas purification method to accomplish the above object includes: supplying a purification agent to be consumed in an exhaust gas purifier placed in an exhaust passage of an internal combustion engine into the exhaust passage on the upstream side of the exhaust gas purifier with use of an exhaust pipe injector; and mixing the purification agent into the exhaust gas, wherein the purification agent injected into the exhaust passage is made to collide with a dispersing member to accelerate atomization of the purification agent. Based on this configuration, the injected purification agent can be atomized and vaporized, and thereby supplied to the exhaust gas purifier in a uniformly distributed state.

Also, the exhaust gas purification system to accomplish the above object is configured to include: an exhaust gas purifier in an exhaust passage of an internal combustion engine; and an exhaust pipe injector for supplying a purification agent to be consumed in the exhaust gas purifier into the exhaust passage on the upstream side of the exhaust gas purifier and mixing the purification agent into the exhaust gas, wherein a step for making the exhaust passage larger than that on the upstream side of a position in the exhaust passage is provided in the exhaust passage at the position of an injection port of the exhaust pipe injector or its vicinity.

Such a configuration enables the purification agent to be injected into the swirl part of the exhaust gas generated by the step or the vicinity of the swirl, so that mixing with the exhaust gas is accelerated by swirls. The mixing efficiently allows the purification agent to be uniformly dispersed and vaporized within a short distance. For this reason, even if the distance between the injection port of the exhaust pipe injector and the exhaust gas purifier is short, the purification agent reaches the exhaust gas purifier in a uniformly dispersed state. The configuration in which the step is provided in the exhaust passage is simple in structure, and there is no possibility that pressure loss of the exhaust pipe due to attachment of the purification agent, particulate matter (PM) in the exhaust gas, and the like is increased.

Also, if the above exhaust gas purification system is configured to provide a dispersing member for accelerating atomization of the purification agent in the injection passage of the purification agent in the exhaust passage, the purification agent injected into the exhaust passage can be made to collide with the dispersing member to thereby accelerate the atomization of the purification agent, resulting in finer atomization and more uniform dispersion. As the dispersing mechanism, a collision member can be used for performing an atomization action due to a collision of the injection and dispersing the injecting direction, or the like.

Alternatively, the exhaust gas purification system to accomplish the above objective is configured to include: an exhaust gas purifier in an exhaust passage of an internal combustion engine; and an exhaust pipe injector for supplying a purification agent to be consumed in the exhaust gas purifier into the exhaust passage on the upstream side of the exhaust gas purifier and mixing the purification agent into the exhaust gas, wherein a dispersing member for accelerating atomization of the purification agent is provided in an injection passage of the purification agent. Such a configuration enables the injected purification agent to be atomized and uniformly dispersed.

Further, the above exhaust gas purification system is configured such that the exhaust gas purifier is configured to be provided with an ammonia selective reduction type NOx catalyst, and the purification agent is an ammonia system solution. The ammonia system solution includes aqueous ammonia, ammonia aqueous solution, and urea aqueous solution, any of which can be used for the ammonia selective reduction type NOx catalyst.

Alternatively, the above exhaust gas purification system is configured such that the exhaust gas purifier is configured to be any one of an exhaust gas purifier configured to be provided with an oxidation catalyst on the upstream side and a NOx occlusion reduction type catalyst on a downstream side, that configured to be provided with an oxidation catalyst on the upstream side and a NOx direct reduction type catalyst on the downstream side, or that formed by being provided with a continuous regeneration type diesel particulate filter having an oxidation catalyst, and the purification agent is hydrocarbon.

Such a configuration enables the purification agent to be uniformly mixed into the exhaust gas and supplied to the exhaust gas purifier appropriately. Accordingly, purification of NOx, and regeneration of the NOx occlusion reduction type catalyst, NOx direct reduction type catalyst, or continuous regeneration type diesel particulate filter can be efficiently performed.

As described above, the exhaust gas purification method and exhaust gas purification system according to the present invention are capable of efficiently accelerating the vaporization and diffusion of the purification agent within a short distance in the exhaust pipe, and supplying the purification agent to the exhaust gas purifier in a uniformly dispersed state.

Further, the exhaust gas purification method and exhaust gas purification system according to the present invention do not use compressed air, so that they can become available to even a compact car in which the air assist system cannot be used.

DETAILED DESCRIPTION OF THE INVENTION

An exhaust gas purification system according to each embodiment of the present invention will hereinafter be described with reference to the drawings.

Figure 1:
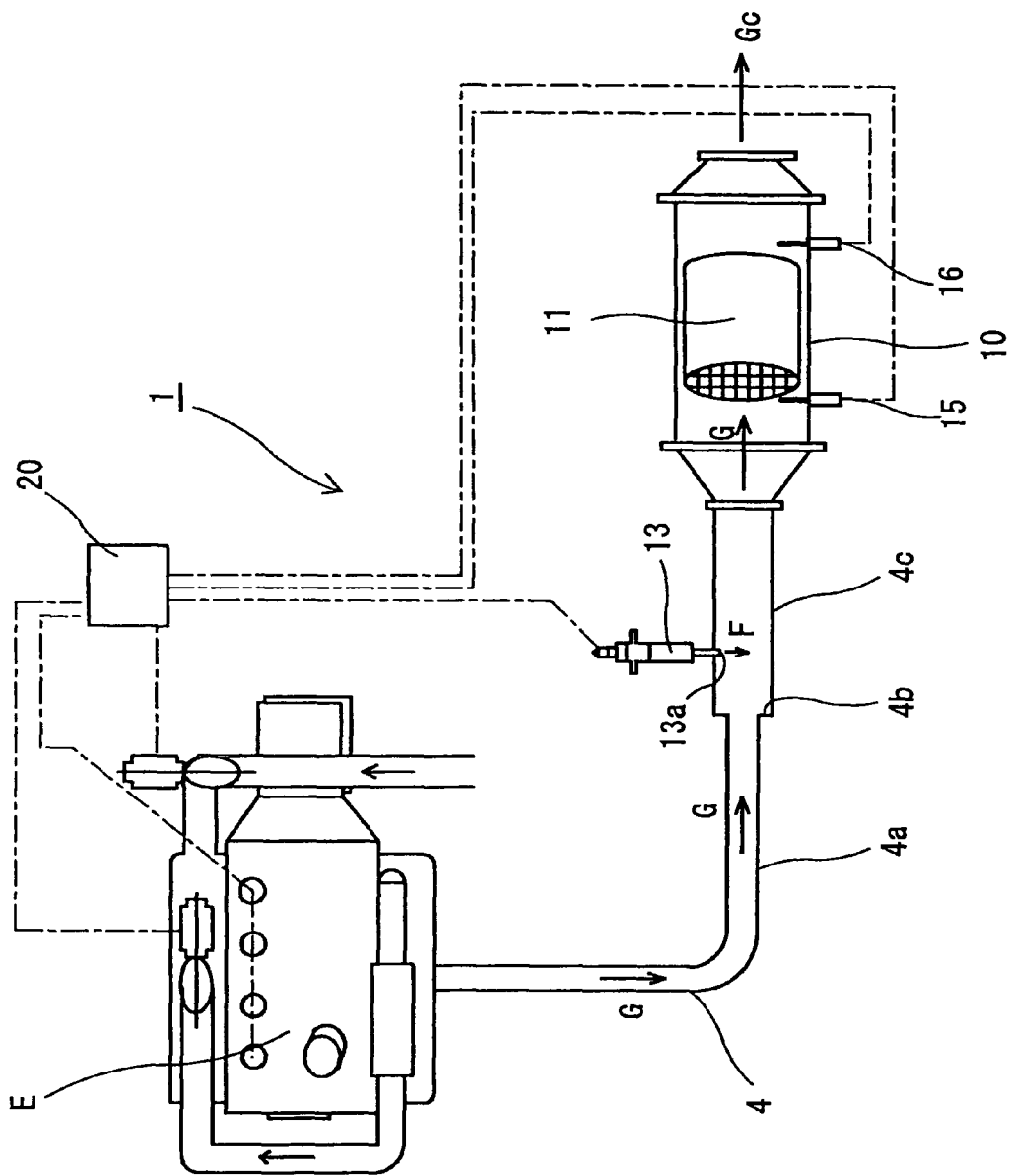
FIG. 1 is a diagram illustrating the overall configuration of an exhaust gas purification system according to an embodiment of the present invention.

FIG. 1 illustrates the configuration of an exhaust gas purification system 1 according to the first embodiment of the present invention. In the exhaust gas purification system 1, an exhaust gas purifier 10 having an ammonia selective reduction type NOx catalyst 11 is arranged in an exhaust passage 4 of an engine (internal combustion engine) E.

The ammonia selective reduction type NOx catalyst 11 is formed by carrying titania-vanadium, zeolite, chromium oxide, manganese oxide, molybdenum oxide, titanium oxide, tungsten oxide, or the like on a honeycomb structural carrier (catalytic structure) formed from cordierite, aluminum oxide, titanium oxide, or the like.

In the ammonia selective reduction type NOx catalyst 11, an ammonia system solution (purification agent) F such as an aqueous urea solution, ammonia, or aqueous ammonia is injected into the exhaust passage 4 in an oxygen-excessive atmosphere to thereby supply ammonia to the ammonia selective reduction type NOx catalyst 11. Then, by selectively reacting the ammonia with NOx in exhaust gas, the NOx is reduced into nitrogen for purification.

For this purpose, the exhaust pipe injector 13 is provided in the exhaust passage 4 on the upstream side of the ammonia selective reduction type NOx catalyst 11 to supply by injection or atomization the ammonia system solution F, which is to be a reducing agent for the NOx. The exhaust pipe injector 13 directly injects the ammonia system solution F, which is supplied from an unshown storage tank through an unshown pipe, into the exhaust passage 4.

Also, in order to measure the temperature of the ammonia selective reduction type NOx catalyst 11, an upstream side temperature sensor 15 and a downstream side temperature sensor 16 are respectively arranged on the upstream and downstream sides of the ammonia selective reduction type NOx catalyst 11, i.e., before and after the catalyst 11. Based on the difference between temperatures measured by the temperature sensors 15 and 16 arranged at the two positions, a temperature difference within the catalyst 11 is estimated.

Further, a control unit for the exhaust gas purification system 1 is incorporated into a control unit 20 for the engine E. The control unit for the exhaust gas purification system 1 controls the exhaust gas purification system 1 in tandem with the operational control of the engine E. The control unit for the exhaust gas purification system 1 also performs injection control of the ammonia system solution F in the exhaust pipe injector 13.

In the injection control, an injection amount of the ammonia system solution F is varied depending on a running state (engine speed and load) of the engine E. The variation of the injection amount allows NOx in the exhaust gas G to be more effectively reduced even if the flow volume of the exhaust gas G is varied. Also, in the injection control, the injection amount is controlled so as to minimize a flowing-out amount of the ammonia (ammonia slip) into purified exhaust gas Gc on the downstream side of the exhaust gas purifier 10.

Still further, in the present invention, the step 4b is provided in a vicinity of the injection port 13a of the exhaust pipe injector 13 in the exhaust passage 4 such that a cross-sectional area of the passage for the exhaust gas discontinuously increases from its downstream side to its upstream side. The step 4b is connected on its upstream side to a smaller diameter part 4a, which is a smaller cross-sectional part in which the cross-sectional area of the passage for the exhaust gas is constant, and on its downstream side to a larger diameter part 4c, which is a larger cross-sectional part in which the cross-sectional area of the passage for the exhaust gas is constant. The larger diameter part 4c is connected to the exhaust gas purifier 10.

Still further, in the configuration illustrated in FIG. 1, the exhaust pipe injector 13 is provided with the injection port (opening) 13a along an inner wall of the exhaust passage 4 such that the ammonia system solution F is injected in a direction perpendicular to a flow direction of the exhaust gas G in the exhaust passage 4. That is, the flow direction of the ammonia system solution F injected from the injection port 13a is made perpendicular to an axial direction of the exhaust passage 4.

Figure 2:
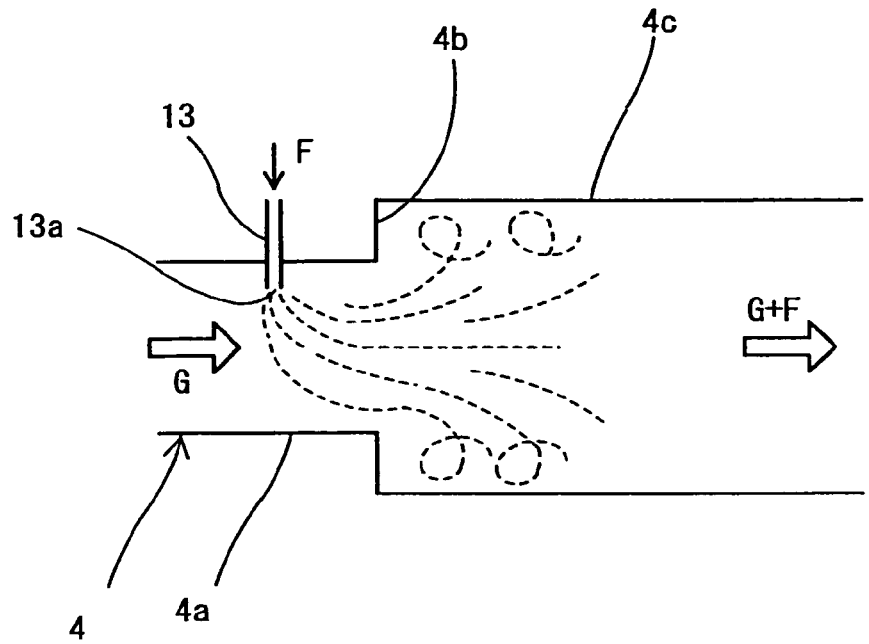
FIG. 2 is a partial diagram illustrating a configuration in which the exhaust pipe injector is provided on the upstream side of the step in the exhaust passage.
Figure 3:
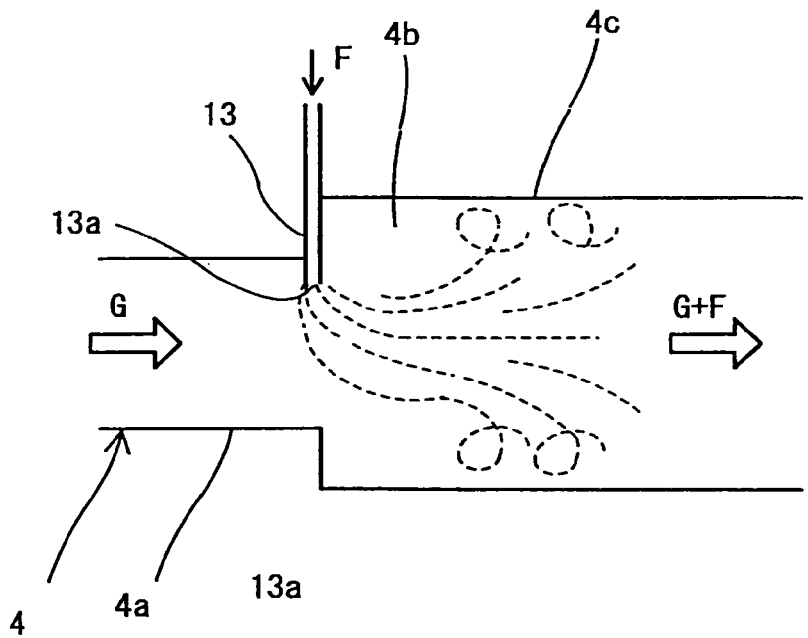
FIG. 3 is a partial diagram illustrating a configuration in which the exhaust pipe injector is provided at the position of the step in the exhaust passage.
Figure 4:
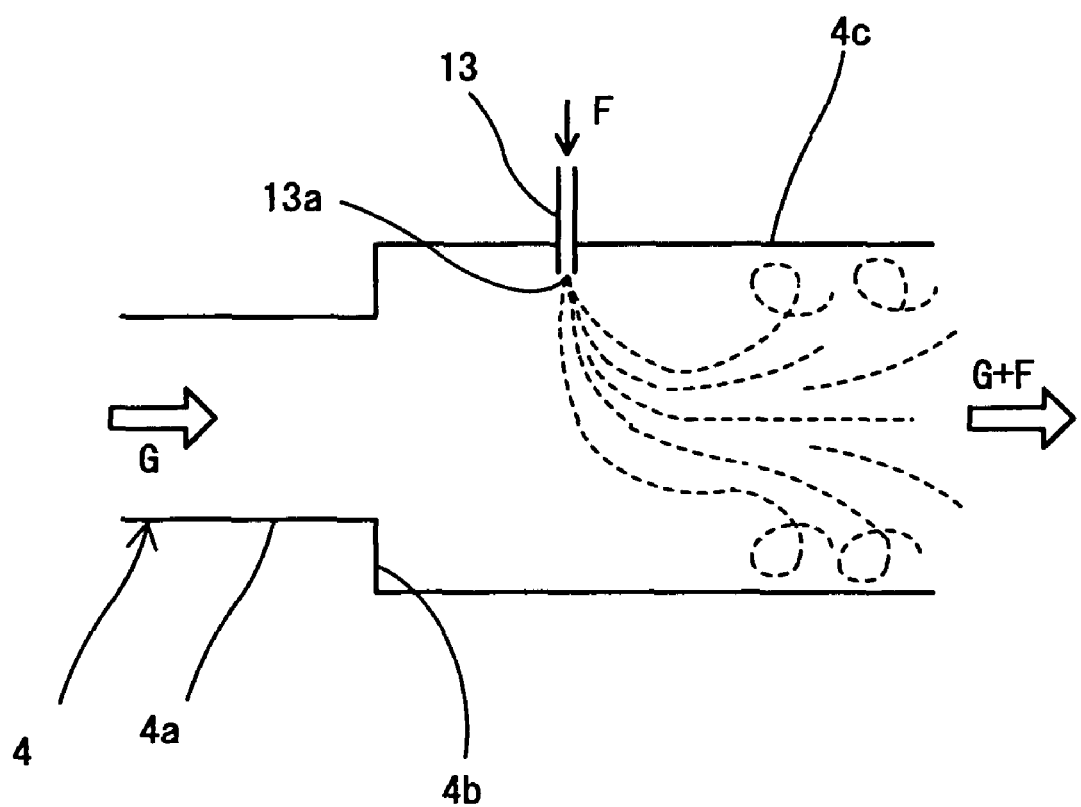
FIG. 4 is a partial diagram illustrating a configuration in which the exhaust pipe injector is provided on the downstream side of the step in the exhaust passage.

Regarding a positional relationship between the injection port 13a and the step 4b, the injection port 13a may be provided on the upstream side of the step 4b as illustrated in FIG. 2, or at a position of the step 4b as illustrated in FIG. 3, or on the downstream side of the step 4b as illustrated in FIG. 4. Which one of them should be selected is determined based on a relationship among a flow velocity range of the exhaust gas G, a flow velocity of the injected ammonia system solution F, a size of the exhaust passage 4, a size and shape of the step 4b, a distance between the step 4b and the exhaust gas purifier 10, and the like. Note that swirls illustrated in FIGS. 1 to 3 as dotted lines are schematically provided simply for illustrative purposes, but do not indicate any flows obtained from numerical calculation results or experimental results.

Figure 6:
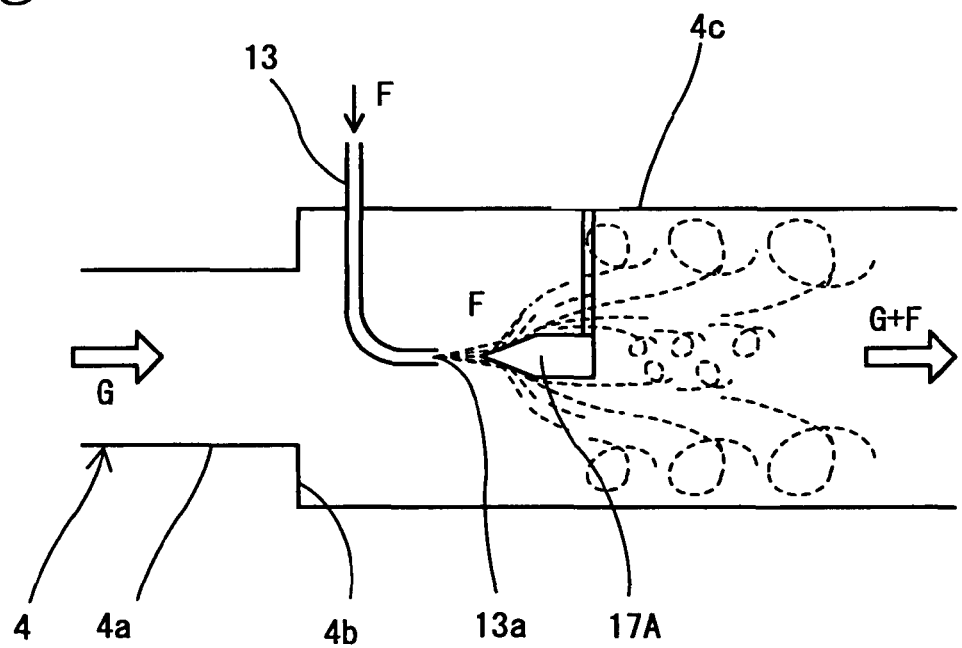
FIG. 6 is a partial diagram illustrating a configuration in which the dispersing member formed of the rod-like body with a cone on its top is provided in the vicinity of the step in the exhaust passage.

Also, for each of an inclination angle of an injection centerline of the ammonia system solution F, an injection spreading range, a position of the injection port 13a, and the like, an optimum configuration can be employed correspondingly to the configuration of the exhaust gas purification system 1. That is, there may be employed a configuration other than the configurations as illustrated in FIGS. 1 to 4 in each of which the ammonia system solution F is injected in the direction perpendicular to the flow direction of the exhaust gas G. For example, as illustrated in FIG. 6, there may be employed a configuration in which the ammonia system solution F is injected in a direction parallel to the flow direction of the exhaust gas G.

Further, the step 4b has an equally expanding shape in each of FIGS. 1 to 4, i.e., the smaller diameter part 4a on the upstream side and the larger diameter part 4c on the downstream side are concentrically formed. However, depending on an arrangement of the exhaust pipe injector 13, the injecting direction, the injecting rate, or the flow velocity of the exhaust gas G, they may be eccentrically connected to each other. Also, there may be a difference in the cross-sectional shape between the smaller and the larger diameter parts 4a and 4c. For example, the smaller diameter part 4a may be formed into a circular pipe, whereas the larger diameter part 4a may be formed into an elliptical pipe. In short, it is only necessary to be a shape capable of generating a swirl by which the ammonia system solution F injected into the exhaust passage 4 can be efficiently mixed with the exhaust gas G, and dispersed and made uniform in it.

In such a configuration, the step 4b is provided in a linear part of the exhaust passage 4 to purposely generate swirls in the stable exhaust gas flow. Along with this, based on the configuration in which the injection port 13a of the exhaust pipe injector 13 is provided in the vicinity of the step 4b to inject the ammonia system solution F, the ammonia system solution F is mixed with and diffused into the exhaust gas G due to the swirls generated by the step 4b. For this reason, exhaust gas temperature is made uniform, and therefore any reduced temperature parts do not appear. Accordingly, the ammonia system solution F is efficiently vaporized. Also, in the exhaust passage 4, the ammonia system solution F is efficiently vaporized and diffused within a short distance, and then reaches the exhaust gas purifier 10 uniformly. As a result, even with an arrangement in which a distance between the injection port 13a of the exhaust pipe injector 13 and the exhaust gas purifier 10 is short, the ammonia system solution F can be uniformly diffused and supplied to the exhaust gas purifier 10.

Also, a cross-sectional area of the exhaust gas purifier 10 is formed typically larger than that of the exhaust passage 4, so that the larger diameter part 4c on the downstream side of the step 4b can also produce an effect of partially contributing to the enlargement of the cross-sectional area in order to install the exhaust gas purifier 10.

Next, a second embodiment is described. In the second embodiment, as illustrated in FIG. 5 or 6, a collision plate 17 or 17A is provided as a dispersing member for accelerating atomization of the ammonia system solution (purification agent) F at an injection passage of the ammonia system solution F in the exhaust passage 4, in addition to the configuration of the exhaust gas purification system 1 of the first embodiment.

The collision plate 17 or 17A only requires a function of dispersing the ammonia system solution F injected to the collision plate 17 or 17A. In addition, if besides the injection dispersing function, the collision plate 17 or 17A is made to have a swirl generating function for transforming the flow of the exhaust gas G into swirls, the ammonia system solution F can be more dispersed and becomes more uniform.

Figure 5:
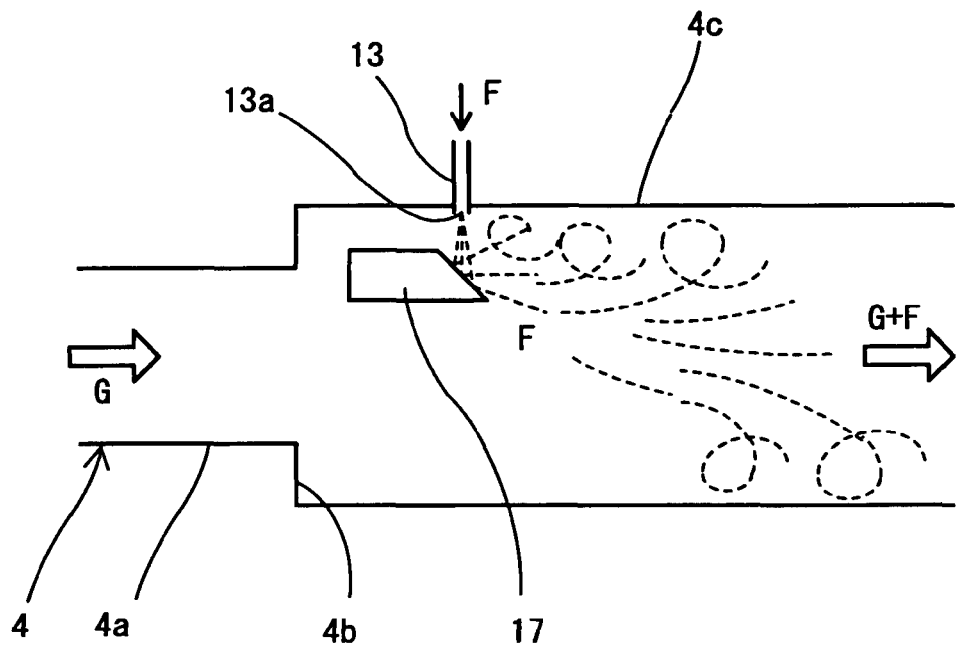
FIG. 5 is a partial diagram illustrating a configuration in which the dispersing member formed of the collision plate is provided in the vicinity of the step in the exhaust passage.

In the configuration illustrated in FIG. 5, a part with which the ammonia system solution F collides is formed of the collision plate 17 with a flat surface forming an appropriate angle (e.g., 30 to 60°) with respect to the injecting direction.

The collision plate 17 can have an advantageous effect when the injecting direction of the ammonia system solution F forms a right angle or a near right angle with respect to the flow direction of the exhaust gas G.

Also, in the configuration illustrated in FIG. 6, the collision plate 17 A is formed of a rod-like body having a cone-like shape of which a tip faces to the injection port for the purification agent. This configuration can produce a large effect when the injecting direction of the ammonia system solution F forms an angle parallel to or near parallel to the flow direction of the exhaust gas G.

The dispersion effect of the collision plate 17 or 17A can accelerate the atomization of the ammonia system solution F, resulting in finer atomization and more uniform dispersion.

Figure 7:
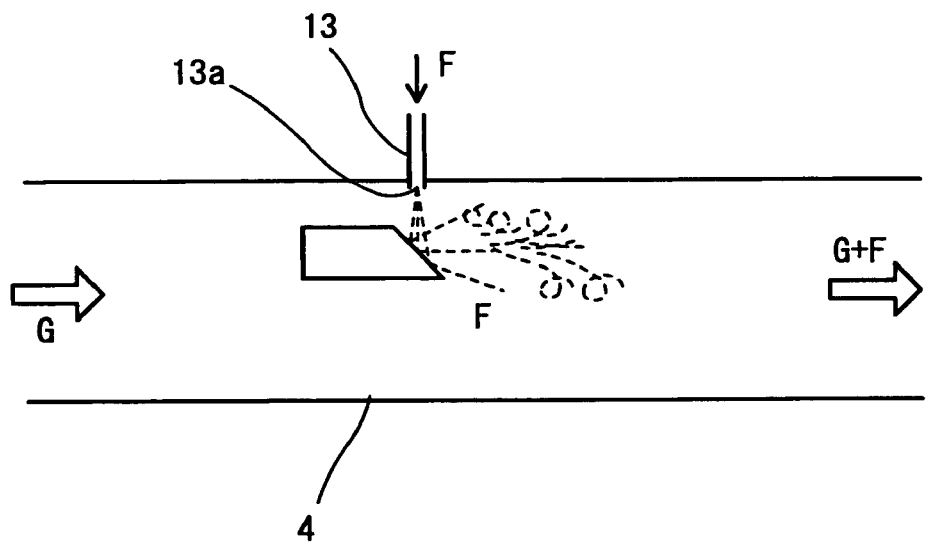
FIG. 7 is a partial diagram illustrating a configuration in which the dispersing member formed of the collision plate is provided without providing the step in the exhaust passage.
Figure 8:
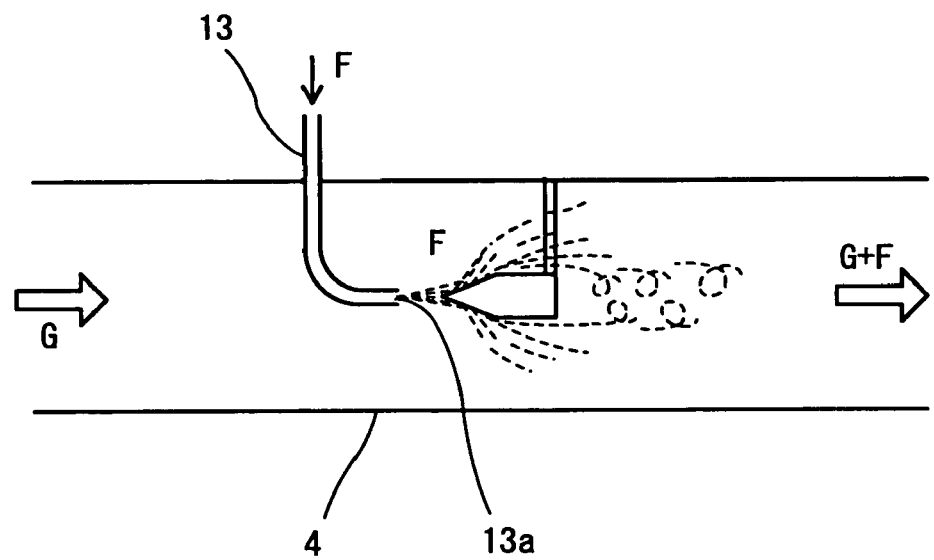
FIG. 8 is a partial diagram illustrating a configuration in which the dispersing member formed of the rod-like body with a cone on its top is provided without providing the step in the exhaust passage.

As illustrated in FIGS. 7 and 8, a third embodiment has a configuration in which the collision plate 17 or 17A is provided in the injection passage of the ammonia system solution (purification agent) F to accelerate the atomization of the ammonia system solution F, similarly to the configuration of the exhaust gas purification system according to the second embodiment; however, a step is not provided in the exhaust passage 4.

The collision plate 17 or 17A may have the same configuration as in the second embodiment, resulting in the same operational effect. However, because of the absence of the step 4b in the exhaust passage 4, swirls potentially generated by the step 4b cannot be utilized. However, the collision plate 17 or 17A itself generates swirls, so that an operational effect due to swirls can be utilized. The operational effect due to swirls is typically smaller than that due to the swirls generated by the step 4b. However, by forming the collision plate 17 or 17A into a shape that facilitates the generation of swirls, a required dispersion and uniformity effect can be obtained.

In the exhaust gas purification system according to any of fourth to sixth embodiments, the exhaust gas purifier 10 is provided with an oxidation catalyst on the upstream side and a NOx occlusion reduction type catalyst on the downstream side. Also, the purification agent is a hydrocarbon. The rest of the configuration is the same as that in any of the first to third embodiments.

This oxidation catalyst is formed by carrying a catalytic metal such as platinum, rhodium, or palladium on a monolithic catalyst formed from a structural material such as cordierite, silicon carbide, or stainless steel. Also, the NOx occlusion reduction type catalyst carries a noble metal catalyst with an oxidation function, such as platinum (Pt), and a NOx occluding material with a NOx occluding function, such as an alkali metal, alkaline-earth metal, or rare earth. Such components allow both the NOx occlusion function and NOx release/purification function to be fulfilled, depending on an oxygen concentration in the exhaust gas.

The NOx occlusion reduction type catalyst makes the catalytic metal occlude NOx during normal operation, and as an occluding ability approaches saturation, the air/fuel ratio of the exhaust gas flowing in is brought to the rich air/fuel ratio at the right time to release the occluded NOx and reduce the released NOx with the aid of the three-way function of the catalyst.

In the exhaust gas purification system provided with the NOx occlusion reduction type catalyst, when an estimated amount of the NOx occlusion reaches a NOx saturation amount, the exhaust pipe injector 13 directly supplies the hydrocarbon (purification agent) F such as fuel into the exhaust passage 4. By oxidizing the hydrocarbon F with the oxidation catalyst on the upstream side, the air/fuel ratio of the exhaust gas G is brought into the rich state to release the occluded NOx. The released NOx is reduced with the noble metal catalyst. Such regeneration treatment allows the NOx occluding ability to be recovered.

In the exhaust gas purification system according to any of seventh to ninth embodiments, the exhaust gas purifier 10 is formed by being provided with an oxidation catalyst on the upstream side and a NOx direct reduction type catalyst on the downstream side. Also, the purification agent is a hydrocarbon. The rest of the configuration is the same as that in any of the first to third embodiments.

The oxidation catalyst is, similarly to that in the fourth to sixth embodiments, formed by carrying the catalytic metal such as platinum, rhodium, or palladium on the monolithic catalyst formed from the structural material such as cordierite, silicon carbide, or stainless steel. Also, the NOx direct reduction type catalyst is formed by making a carrier such as β-zeolite carry a catalytic metal such as rhodium (Rh) or palladium (Pd). Further, the following steps are performed: Cerium (Ce) is mixed, which suppresses an oxidation action of the metal and contributes to retention of a NOx reducing ability. A three-way catalyst is provided in a lower layer to facilitate a redox reaction, particularly a reductive reaction of NOx in a rich state of the exhaust gas. Iron (Fe) is added to the carrier to improve the NOx conversion efficiency.

The NOx direct reduction type catalyst directly reduces NOx in a lean state during normal operation. At the time of the reduction, oxygen ($O_2$) is adsorbed to the metal as an active substance of the catalyst, and thereby the reducing ability deteriorates. For this reason, when the NOx reducing ability deteriorates, the exhaust pipe injector 13 directly supplies the hydrocarbon (purification agent) F such as fuel into the exhaust passage 4. By oxidizing the hydrocarbon F with the oxidation catalyst on the upstream side, the air/fuel ratio of the exhaust gas G is brought into a rich state. This rich state allows the metal, which is the active substance of the catalyst, to be regenerated and activated.

In the exhaust gas purification system according to any of tenth to twelfth embodiments, the exhaust gas purifier 10 is formed by being provided with a continuous regeneration type diesel particulate filter having an oxidation catalyst. Also, the purification agent is a hydrocarbon. The rest of the configuration is the same as that in any of the first to third embodiments.

In addition, as the continuous regeneration type diesel particulate filter having the oxidation catalyst, there exists one that is formed of an oxidation catalyst on the upstream side and a filter on the downstream side, or one formed of a filter carrying an oxidation catalyst, or of other components.

The oxidation catalyst on the upstream side is, similarly to the fourth to sixth embodiments, formed by carrying the catalytic metal such as platinum, rhodium, or palladium on the monolithic catalyst formed from the structural material such as cordierite, silicon carbide, or stainless steel. Also, the filter is formed of a monolithic honeycomb/wall-through type filter in which inlets and outlets of channels of the porous ceramic honeycomb are alternatively sealed, i.e., sealed checkerwise. This filter traps PM (particulate matter) in the exhaust gas.

On the other hand, the filter carrying the oxidation catalyst is formed by carrying a catalytic metal such as platinum, rhodium, or palladium on a monolithic honeycomb/wall-through type filter. This filter traps PM in the exhaust gas.

In order to combust and remove the PM trapped and accumulated in the filter part, the exhaust pipe injector 13 supplies the hydrocarbon (purification agent) F such as light oil fuel into the exhaust passage 4. By oxidizing the hydrocarbon F with an oxidation catalyst placed on the upstream side of the filter or one carried by the filter, the temperature of the filter is elevated to thereby combust and remove the PM in the filter part.

In the exhaust gas purification system 1 according to any of the above first to twelfth embodiments, in which the purification agent F is supplied into the exhaust passage 4, mixing of the purification agent F injected at the step 4b part or its vicinity and the exhaust gas is accelerated due to the swirls generated by the step 4b or the collision plate 17 or 17A. The mixing allows the purification agent F to be uniformly dispersed and vaporized within a short distance. For this reason, the purification agent F is efficiently vaporized and diffused within a short distance. As a result, the purification agent F reaches the exhaust gas purifier in a uniform state.

Also, the collision plate 17 or 17A provided in the exhaust passage 4 accelerates atomization of the purification agent F by making the injected purification agent F collide with the collision plate 17 or 17A, and thereby the purification agent F can be more finely atomized and more uniformly dispersed.

Accordingly, even with an arrangement in which the distance between the position for injecting the purification agent F and the exhaust gas purifier 10 is short, the purification agent F can be supplied to the exhaust gas purifier 10 in a uniformly diffused state.

EXAMPLE

Figure 9:
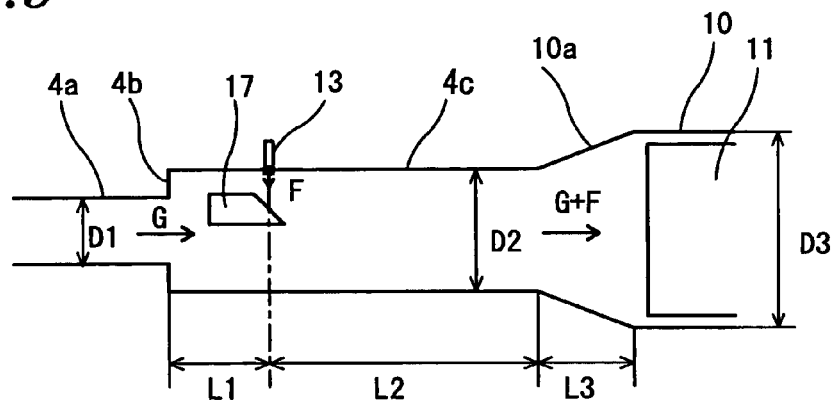
FIG. 9 is a diagram illustrating configurations of the step in the exhaust passage and in the vicinity of the exhaust pipe injector in the exhaust gas purification system of Example.
Figure 10:
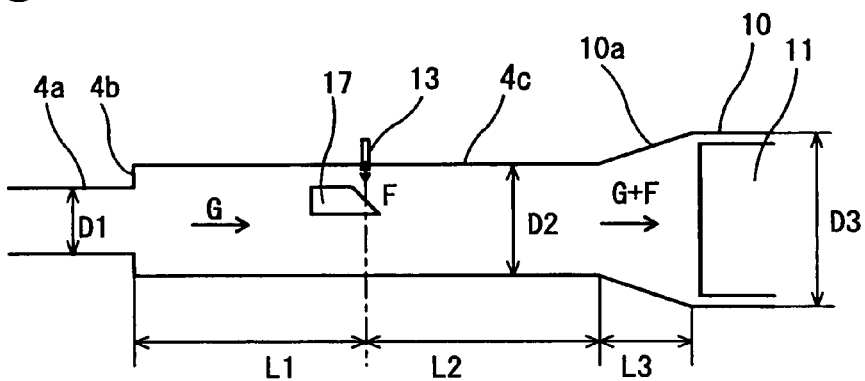
FIG. 10 is a diagram illustrating configurations of the step in the exhaust passage and in the vicinity of the exhaust pipe injector in the exhaust gas purification system of Comparative Example 1.
Figure 11:
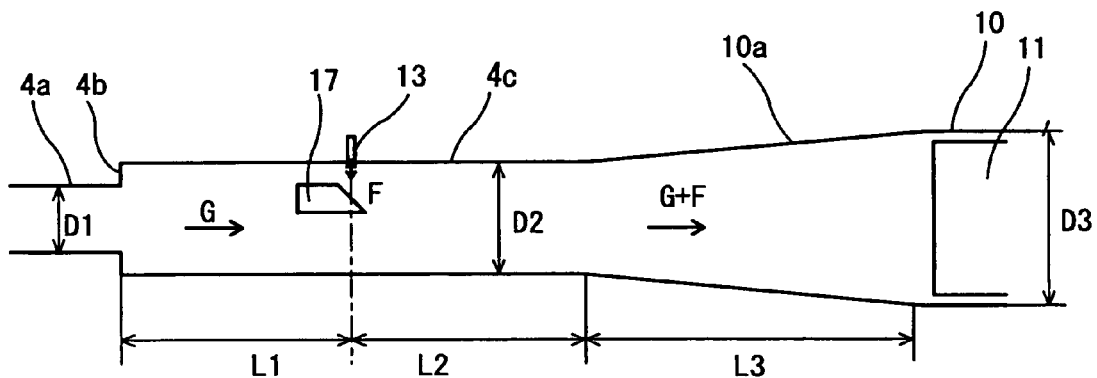
FIG. 11 is a diagram illustrating configurations of the step in the exhaust passage and in the vicinity of the exhaust pipe injector in the exhaust gas purification system of Comparative Example 2.

When both the step 4b and the collision plate 17 are provided, more specifically a configuration such as illustrated in FIG. 9 was used as an Example, and a configuration as illustrated in FIG. 10 in which the distance L1 between the step 4b and the collision plate (dispersing member) 17 was made longer was used as Comparative Example 1. Also, as illustrated in FIG. 11, a configuration in which a long divergent pipe 10a was provided on a downstream side in addition to the configuration of Comparative Example 1 was used as Comparative Example 2.

In each of the Example and Comparative Examples 1 and 2, the diameter D1 of the smaller diameter part 4a is 50 mm, that D2 of the larger diameter part 4c is 90 mm, and that D3 of the larger diameter part 4c of the exhaust gas purifier 10 is 239 mm. Also, in the Example, L1 is 145 mm, L2 555 mm, and L3 154 mm. On the other hand, In Comparative Example 1, L1 is 670 mm, L2 555 mm, and L3 154 mm. In Comparative Example 2, L1 is 670 mm, L2 555 mm, and L3 870 mm.

Further, regarding the collision plate 17, the center of a surface of the collision plate 17 with which the ammonia system solution F collides is positioned at a distance of 10 mm from the wall surface. The collision surface of the collision plate 17 is fixed at 45 degrees with respect to both the flow direction of the exhaust gas and the main injecting direction of the ammonia system solution F.

On the Example and Comparative Examples 1 and 2, atomization analyses based on numerical calculations and NOx purification tests were performed.

The atomization analyses based on the numerical calculations were performed under the conditions of an average speed of 42.44 m/s, pulsation cycle of 44 Hz, pulsation amplitude of 12.96 m/s, turbulence intensity of 3.0%, exhaust gas temperature of 550° K, exhaust gas density of 0.646 kg/m3, and pressure of 92.5 Pa, i.e., under the condition of a temperature at which the atomization (injected urea) becomes well vaporized, and a catalyst activation temperature or higher. Calculation results of the distribution of the atomization, the fluidized state of droplets, and other factors led to the following findings:

In the Example, it has turned out from a calculation result of a flow velocity distribution in the vicinity of the step 4b that the exhaust gas G flows from the smaller diameter part 4a to the larger diameter part 4b while spreading, and that the exhaust gas G having flowed in the smaller diameter part 4a in a stable flow is here brought into an unstable flow state along with the turbulence and the change in flow velocity. It has also turned out that near a position where the spreading exhaust gas G reaches the wall surface of the larger diameter part 4c, a part of the exhaust gas G flows backward along the wall surface. That is, the part of the exhaust gas G flows backward to thereby reduce the flow velocity in a flow field on the upstream side of the exhaust pipe injector 13, so that the velocity distribution is unstable in a region (flow field) where the exhaust gas flows while spreading.

In the Example, the exhaust pipe injector 13 along with the collision plate (dispersing member) 17 is provided at a position where the spreading of the exhaust gas flow finishes in the vicinity of the step 4b. By utilizing the unstableness of the flow field at this position, the atomization and diffusion are accelerated.

Also, the calculation result of the fluidized state of the droplets indicating atomization behaviors has led to the following findings: In the case where the exhaust pipe has a shape including the step 4b, the injected (or atomized) droplets F gradually flow downstream while being taken into an accumulation part caused by the backward flow or the like. For this reason, the vaporization is efficiently carried out, and therefore no droplet F can reach the ammonia selective reduction type NOx catalyst (SCR catalyst) 11. In addition, it has turned out from another calculation result that if the step 4b is not provided, the injected droplets F reach the ammonia selective reduction type NOx catalyst 11 while keeping a droplet state.

In Comparative Example 1, the calculation result of the fluidized state of the droplets F indicates that because the flow field is very stable at the position of the exhaust pipe injector 13 and the flow velocity is high, the droplets F from the exhaust pipe injector 13 are carried by the flow and thereby flowed downstream immediately after they have been injected into the exhaust pipe 4 and have collided with the collision plate 17. For this reason, the injected droplets F are not diffused into the entire exhaust pipe 4, and therefore a dense part of the atomization remains to the end. As a result, the dense part of the atomization reaches a front surface of the catalyst while keeping a droplet state.

In Comparative Example 2, the calculation result of the fluidized state of the droplets F indicates that because a shape of the exhaust pipe 4 is the same as that in Comparative Example 1 until a diffusion part of the divergent pipe 10a is reached, the flow field is stable and the flow velocity is high as well. Accordingly, the droplets F injected from the exhaust pipe injector 13 are not diffused into the entire exhaust pipe 4, and therefore a dense part of the atomization reaches the diffusion part 10a while remaining to the end. Then, because the length L3 of the diffusion part 10a is extended, the dense part of the atomization is gradually spread, and when it reaches a front surface of the catalyst 11, atomization density becomes almost uniform. Also, it has turned out that because a time to vaporize the atomization can be ensured, the atomi zation does not reach the front surface of the catalyst in a droplet state, differently from Comparative Example 1.

However, in Comparative Example 2, the length L3 of the diffusion part is extended, so that there arise problems whereby a time for the atomization to reach the catalyst 11 becomes longer, and therefore responsiveness during transient operation decreases, and that because of the shape of the diffusion part, a restriction arises when the system is mounted on a vehicle.

Further, it has turned out from a comparison of the calculation results of the concentration distribution of the atomization that, in the Example, the atomization reaches the front surface of the catalyst 11 in a more uniformly distributed state, compared with Comparative Example 1. Also from this result, it has turned out that the part of the atomization gradually flows out downstream while being taken and accumulated in the backward flow.

Results of the NOx purification tests are then described. The NOx purification tests were performed in the ninth mode (60% engine speed and 60% torque of rated engine speed) of the gasoline 13-mode test. The results are illustrated in FIGS. 12 and 13.

Figure 12:
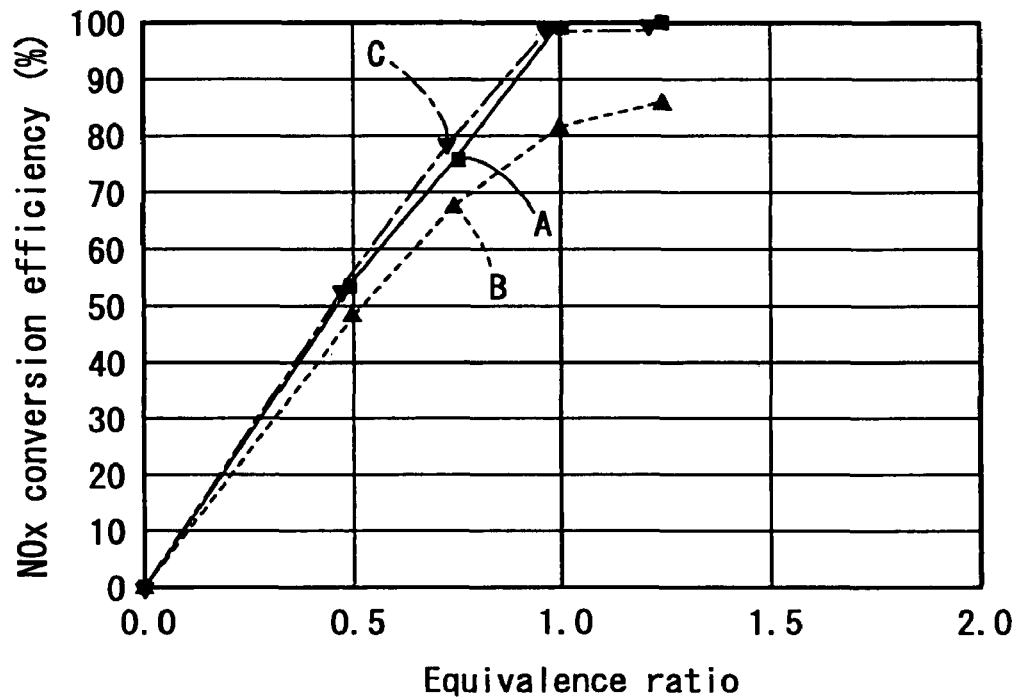
FIG. 12 is a diagram illustrating NOx conversion efficiencies in Example and Comparative Examples 1 and 2.

An equivalence ratio indicated on the horizontal axis of FIG. 12 means the ratio of ammonia that reacts with NOx in an ideal state. That is, the equivalence ratio of 1 means that ammonia generated from injected urea reacts with NOx in the exhaust pipe in the proportion of 1 to 1 in terms of amount.

From FIG. 12 illustrating a comparison of NOx conversion (purifying) efficiencies, it turns out that in the Example (solid line A) and Comparative Example 2 (dashed-dotted line C), the NOx conversion efficiencies vary in an almost ideal state, and respectively reach 98% and 99% at the equivalence ratio of 1.0, both of which exceed a minimum targeted NOx conversion efficiency of 90%. However, in contrast to the Example and Comparative Example 2, in Comparative Example 1 (dashed line B), it turns out that the NOx conversion efficiency begins to fall below an ideal conversion efficiency (conversion efficiency of 50% for equivalence ratio of 0.5) already at around the equivalence ratio of 0.5, and exhibits the NOx conversion efficiency of 82% at the equivalence ratio of 1.0. In addition, the NOx conversion efficiencies in the entire gasoline 13-mode test were 75%, 87%, and 57% in the Example, and Comparative Examples 1 and 2, respectively.

Figure 13:
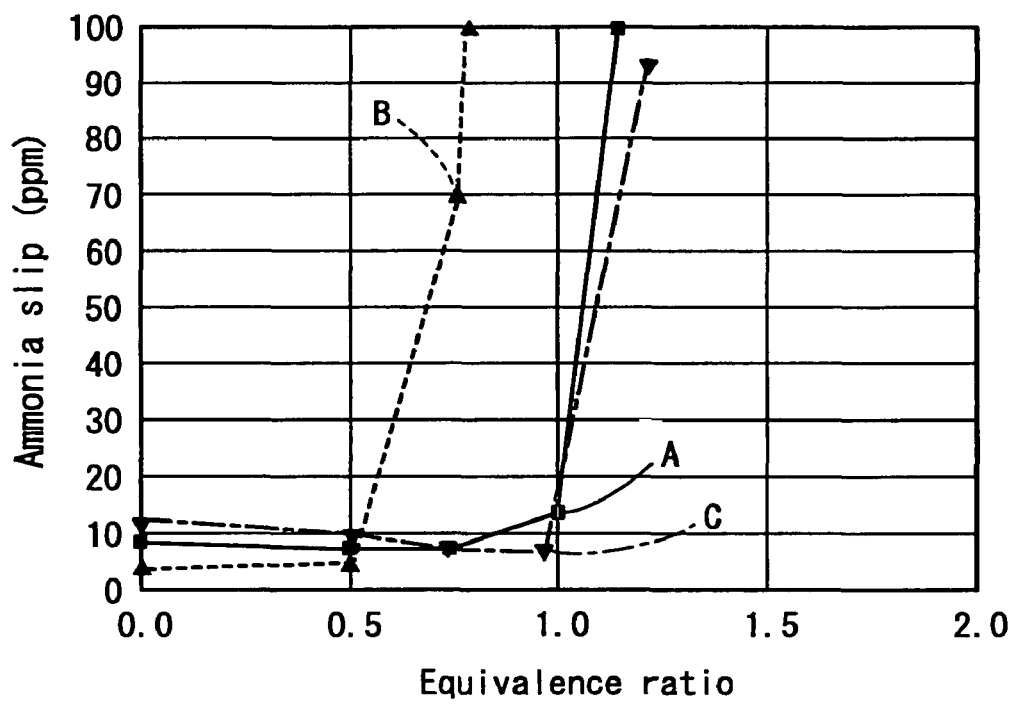
FIG. 13 is a diagram illustrating ammonia slips in Example and Comparative Examples 1 and 2.

Also, from FIG. 13, it turns out that in the Example (solid line A) and Comparative Example 2 (dashed-dotted line C), the ammonia slips remain at small values until the equivalence ratio of around 1.0, with respect to a target ammonia slip of 20 ppm, whereas in Comparative Example 1 (dashed line B), the ammonia slip rapidly increases when the equivalence ratio exceeds 0.5.

Accordingly it turns out that the exhaust pipe shape in which the step 4b is provided in the vicinity of the exhaust pipe injector 13 on the upstream side allows higher NOx conversion efficiency to be obtained without extending a length of the exhaust pipe.

The exhaust gas purification method and exhaust gas purification system of the present invention having the above excellent effects can be very effectively utilized as an exhaust gas purification method and an exhaust gas purification system for an internal combustion engine mounted on a vehicle, or the like.

What is claimed is:

1. An exhaust gas purification system, comprising:
an exhaust gas purifier in an exhaust passage of an internal combustion engine;
an exhaust pipe injector for injecting a purification agent, to be consumed in the exhaust gas purifier, into the exhaust passage on an upstream side of the exhaust gas purifier;
a dispersing member downstream of the injector and having a collision surface which is acute or obtuse relative to the injection direction,
wherein an injection port of the exhaust pipe injector injects the purification agent in the injection direction which is parallel to a flow direction of the exhaust gas and the dispersing member has a length that extends in the injection direction, a tip of the dispersing member is formed in a cone shape, the tip of the dispersing member is disposed on the upstream side of the dispersing member, the purification agent is injected toward the cone-shaped tip, and the cone-shaped tip faces the injection port.

2. The exhaust gas purification system according to claim 1, further comprising:
a step in the exhaust passage such that the exhaust passage is expanded on the downstream side of the step,
wherein the step is provided in the exhaust passage at a position of the injection port of the exhaust pipe injector or in a vicinity of the exhaust pipe injector.

3. The exhaust gas purification system according to claim 1 or 2, wherein the exhaust gas purifier is provided with an ammonia selective reduction type NOx catalyst, and
wherein the purification agent is an ammonia-based solution.

4. The exhaust gas purification system according to claim 1 or 2, wherein the exhaust gas purifier includes any one of: an oxidation catalyst on the upstream side and a NOx occlusion reduction type catalyst on the downstream side, an oxidation catalyst on the upstream side and a NOx direct reduction type catalyst on the downstream side, and a continuous regeneration type diesel particulate filter with an oxidation catalyst, and
wherein the purification agent is hydrocarbon.

* * * * *